United States Patent [19]
Côté

[11] Patent Number: 5,368,072
[45] Date of Patent: Nov. 29, 1994

[54] SLIDING GATE TERMINAL UNIT FOR AIR HANDLING SYSTEM

[75] Inventor: Anthony Côté, Prévost, Canada

[73] Assignee: E. H. Price Ltd., Winnipeg, Canada

[21] Appl. No.: 165,603

[22] Filed: Dec. 13, 1993

[51] Int. Cl.$^5$ ............................................. F16K 11/00
[52] U.S. Cl. ...................................... 137/872; 454/234
[58] Field of Search ................. 137/872, 873; 454/228, 454/234; 251/279

[56] References Cited

U.S. PATENT DOCUMENTS

| | | | |
|---|---|---|---|
| 3,545,470 | 12/1970 | Paton | 137/111 |
| 3,570,384 | 3/1971 | McLeod | 137/872 X |
| 3,680,468 | 8/1972 | Schueler | 137/872 X |
| 3,690,341 | 9/1972 | Sutko | 137/101 |
| 3,965,933 | 6/1976 | Beaudin | 137/610 |
| 4,686,840 | 8/1987 | Stouffer et al. | 137/872 X |
| 5,165,450 | 11/1992 | Marrelli | 137/875 |

FOREIGN PATENT DOCUMENTS

| | | | |
|---|---|---|---|
| 2547638 | 12/1984 | France | 137/872 |

*Primary Examiner*—John C. Fox

[57] ABSTRACT

A terminal unit for an air handling system and comprised of a housing having a conditioned air inlet for receiving forced conditioned air in the housing. A main outlet opening and a by-pass air outlet opening are provided in the housing. An air flow path is defined between the air inlet and the outlet openings. An air divider gate is slidingly displaceable transverse to the air flow path to deflect air entering the inlet to one or both of the outlet openings. The divider gate has an outlet obstructing rear end and an upstream deflecting face. A linkage assembly is connected to the divider gate to displace the gate across the flow path to simultaneously open one of the outlet openings and close the other, in equal proportions, as desired, while maintaining a substantially constant total outlet opening area as well as maintaining substantially constant inlet air flow conditions. An actuator device, such as an electric motor or a pneumatic system, is connected to the linkage to effectuate the displacement of the divider gate. The force required to displace the divider gate by the actuator device remains substantially constant throughout the displacement of the gate during operating conditions of the air handling system.

5 Claims, 3 Drawing Sheets

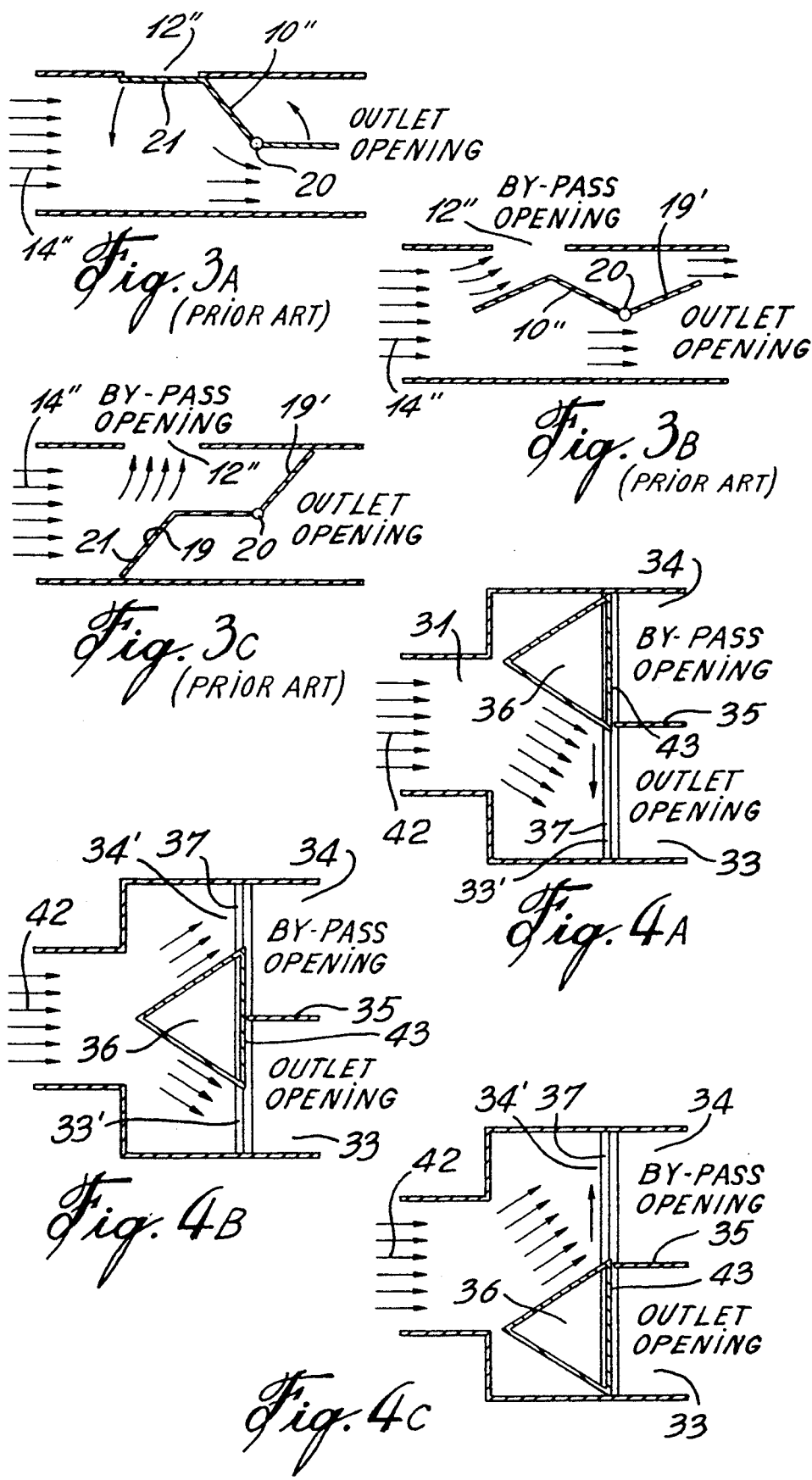

SLIDING GATE TERMINAL UNIT FOR AIR HANDLING SYSTEM

TECHNICAL FIELD

The present invention relates to a terminal unit for use in an air handling system and through which conditioned air flows to a space to be air conditioned and wherein the volume of air entering the space is controlled by the terminal unit which can divert some of the air to a by-pass outlet.

BACKGROUND ART

Terminal units, also referred to in the art as by-pass boxes, are known and are usually of rectangular shape. They have an inlet at one end and an outlet at another end and conditioned air normally flows straight through the box. A by-pass opening may be provided in a top or a side wall of the box, and a diverter element, such as a pivoted blade, is positioned within the box to deflect all or some of the conditioned air entering the inlet to the said by-pass outlet upstream of the outlet. The underlying principle of the air handling system in which by-pass boxes are used is that under all operating conditions, the pressure delivered by the supply fan not decrease and should ideally remain constant. This is due to the fact that in low cost air handling systems, the supply fans used are usually of the forward curve type. These fans have the inherent characteristic of compensating for a drop in system pressure by increasing the air volume at a rapid rate with the result that the power required to drive the fan increases. This then implies that the by-pass box must be able to cycle the supplied air between the space and the by-pass outlet without creating any changes to the air flow at the by-pass box inlet at all positions of the diverter blade throughout this cycle.

The underlying problem with existing by-pass units arises when the diverter blade or plate is at or near the halfway position. In duct systems, pressure is required at the entrance to the system to overcome frictional losses of the air as it moves through the duct system. The quantity of pressure required to move the desired amount of air through the ducts varies with the square of velocity of the air in the ducts. To reduce the quantity of air in a given duct system while maintaining the same pressure at the entrance, it is necessary to increase the resistance to the flow of air in the duct system, i.e., reduce duct size, add restrictions such as dampers, lengthen the duct, etc. For example, let us examine three duct systems: one from the supply fan to the inlet of the by-pass box, one from the inlet of the by-pass box to the conditioned space and one from the inlet of the by-pass box through the by-pass outlet and a manually adjustable balancing damper. Let us suppose for case of argument that through the use of the manually adjustable balancing damper the frictional losses are equal in the two latter duct systems in this example. As the diverter blade moves the conditioned air from one of these two duct systems to the other, the velocity in one duct will drop as the other will increase from zero. In the mid-cycle position of the diverter blade, the air velocity in each duct system will be half of its previous maximum: there are now two outlets for the same quantity of air. With the reduction in air velocity, the frictional losses have been reduced and less pressure is now required to deliver the air to the conditioned space and the by-pass outlet. In response to the change in pressure requirements, the velocity through all three duct systems will then increase until the loss of pressure has been compensated for. This translates into an increase of the airflow at the supply fan. In the case where several by-pass boxes in the system are subjected to the same conditions, the increase in airflow at the supply fan may become more than the supply fan motor can handle.

In known by-pass boxes on the market today, supply fan motors must be oversized to protect against the above eventuality and use more power than would be theoretically necessary if no variations in system pressure were created by the by-pass box. In prior art, several shapes and methods of mounting the diverter blade have been proposed with little or no success in overcoming this problem. In addition, they may create additional problems. In its simplest form, the diverter blade takes the form of a plain rectangular plate that is pivoted on one edge and mounted with the pivot axes close to the wall of the duct adjacent to the by-pass outlet opening. The blade travels between a position in which it closes the opening so that all of the air flows straight through the duct, and a position in which the blade blocks the outgoing air so that the air is totally diverted by the blade into the by-pass opening. Typically, an actuator is mounted externally on the duct and coupled to the shaft for turning the shaft between its two extreme positions under the control of a thermostat in the space to be conditioned. Since pressure is required to move the air from the by-pass box to the conditioned space, it exerts a force perpendicular to the blade that tends to rotate the blade to its extreme positions. The velocity of the air impinging against the blade also exerts an additional pressure and thus a force that tends to rotate the blade out of the air stream. Typically the forces associated with the pressure to overcome the system frictional losses is two to five times the pressure generated by the air velocity. Two problems may arise: 1. The actuator must resist these forces and must supply a relatively high torque to move the diverter blade at or near the extremes of its travel. Relatively powerful actuators must therefore be used with their adjacent additional cost. 2. When the pressure losses downstream from the unit are relatively high, the diverter blade will have a tendency to pulsate as it approaches the extremes of its travel: the pressure differential across the blades is at or near its maximum. In some cases, the diverter blade may flex and snap closed over the opening, causing an audible noise. Also, with the diverter blade at mid-cycle, the supply fan will sense a reduction in pressure and the related problem as described previously.

In an alternate attempt to address these problems, it has been proposed to relocate the pivot axe to the center of the rectangular blade and extend it perpendicular to the airstream through the center of opposite faces of the rectangular duct. In this configuration, part of the blade is above the pivot shaft and an equal part below so that the turning effect on the shaft imposed by the pressure and air velocity impinging on one part of the blade is counteracted and ideally balanced by the pressure and air velocity that impinges on the other part of the blade. While this blade arrangement avoids the imposition of high torque loads on the blade pivot shaft, an auxiliary blade must be provided to close the by-pass outlet in the duct when all of the air is to flow straight through. Normally, the auxiliary blade is pivoted through the center or less ideally to the edge of the by-pass opening and out of the main air flow through the duct, and the auxiliary blade is coupled to the main diverter blade by a linkage so that the auxiliary blade is opened and closed automatically in response to the turning of the main diverter blade under the control of the actuator. This arrangement not only introduces additional components and, therefore, cost and attendant service difficulties, but the problem of the pressure drop at mid-cycle is still present. In the case where the auxiliary blade is pivoted at its edge, the actuator must also overcome the additional load of the pressure acting against the blade.

In an attempt to eliminate the additional auxiliary blade, it has been proposed that the blade have an angled shape with an intermediate blade portion selected so that, in the diverting position, the blade presents to the incoming air, surface portions of substantially similar area disposed on respectively opposite sides of the shaft and, in the straightthrough position, a portion of the blade closes the bypass outlet. While this arrangement will ideally eliminate the forces attributed to the air velocity, the higher forces due to pressure acting perpendicular to the blade are not balanced since the surface portions of the blade as seen by this pressure are not equal on both sides of the pivot shaft. This proposal is also subject to the pulsation and flexing problems noted for the edge pivoted diverter blade and only slightly addresses the problem of the drop in pressure at mid-cycle.

SUMMARY OF INVENTION

It is a feature of the present to provide a variable air volume terminal unit for an air handling system which substantially overcomes the abovementioned disadvantages of the prior art.

Another feature of the present invention is to provide a variable air volume terminal unit for an air handling system, and wherein the unit is provided with an air divider gate which is slidingly displaceable transverse to the air flow path to deflect air entering an inlet of the unit to one or both of an outlet opening or a by-pass opening, and wherein the actuator device used to displace the divider gate is subjected to a substantially constant force during its displacement of the divider gate.

Another feature of the present invention is to provide a variable air volume terminal unit for an air handling system wherein the unit is comprised of a housing having an inlet for receiving forced conditioned air, a main outlet and a by-pass outlet and an air divider gate which is slidingly displaceable transverse to an air flow path defined between the inlet and the outlet openings and wherein substantially constant inlet air flow conditions are maintained during the displacement of the divider gate.

According to the above features, from a broad aspect, the present invention provides a variable air volume terminal unit for an air handling system comprised of a housing having a conditioned air inlet for receiving forced conditioned air in the housing. The housing also has a main outlet opening and a bypass air outlet opening. An air flow path is defined between the air inlet and the outlet openings. An air divider gate is slidingly displaceable transverse to the air flow path to deflect air entering the inlet to one or both of the outlet openings. The divider gate has an outlet obstructing rear end and an upstream deflecting face. Linkage means is connected to the divider gate. An actuator device is connected to the linkage means to displace the divider gate across the air flow path to simultaneously open one of the outlet openings and close the other in predetermined proportions as desired while maintaining a substantially constant total outlet open area as well as increasing the pressure drop through the unit at or near mid-cycle so as to substantially compensate for the reduction in pressure created by the low velocities in the outlets and thus maintaining substantially constant inlet air flow conditions, while the force required to displace the divider gate by the actuator device remains substantially constant.

BRIEF DESCRIPTION OF DRAWINGS

A preferred embodiment of the present invention will now be described with reference to the accompanying drawings, in which:

FIGS. 1A to 1C, 2A to 2C, and 3A to 3C are schematic representations of divider gates of the prior art;

FIGS. 4A to 4C are schematic representations of the operation of the divider gate of the present invention;

DESCRIPTION OF PREFERRED EMBODIMENTS

Figure 1A:
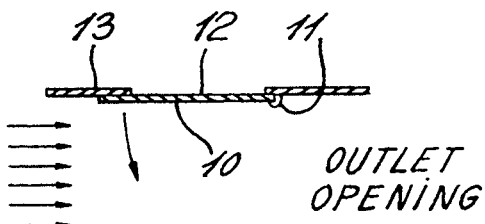
Figure 1B:
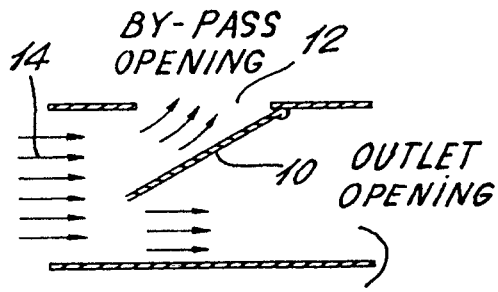
Figure 1C:
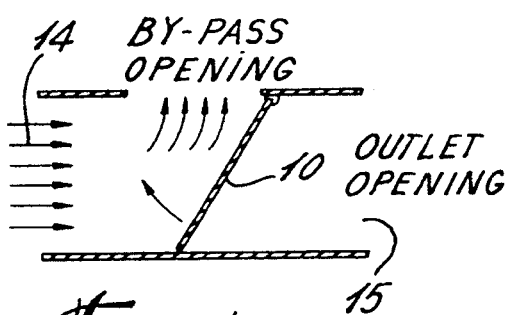

FIGS. 1A to 1C are schematic representations of a simple form of a divider blade or gate of the prior art wherein the gate 10 is mounted on a pivot 11 secured adjacent a by-pass opening 12 provided in a side wall or top wall 13 of a terminal unit (not shown). As the diverter gate 10 is pivoted downwardly, as shown in FIG. 1B, some of the pressurized incoming conditioned air, indicated by arrows 14, is diverted to the by-pass opening 12 and the remaining air flows through to the main opening 15. As can be seen, the incoming air stream 14, which is under pressure, will exert a perpendicular force against that blade to tend to rotate the blade to its extreme by-pass position, as shown in FIG. 1C. In order to resist this force, the actuator, which operates the pivotal gate, must supply a relatively high torque. Therefore, it is necessary to have powerful actuators, as previously described, and these are very costly.

Figure 2A:
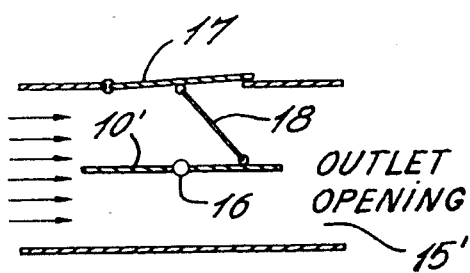
Figure 2B:
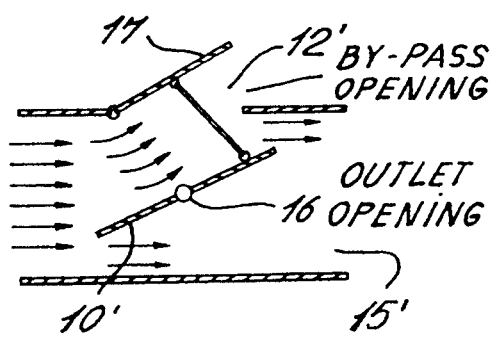
Figure 2C:
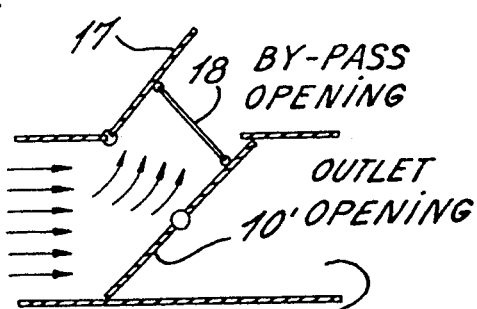

FIGS. 2A to 2C are further representations of another type of prior art divider gate wherein the pivot axis 16 has been relocated to the center of the blade 10'. Although this arrangement avoids the imposition of high torque loads on the blade pivot shaft 16, an auxiliary gate 17 is required to close the by-pass opening 12' when all of the air is to flow straight through the duct to the outlet opening 15', as shown in FIG. 2A. The auxiliary gate 17 is coupled to the diverter blade 10' by a linkage 18. This type of an arrangement requires additional components which results in added costs and maintenance, and furthermore, the actuator must also overcome the additional load of the pressure acting against the auxiliary blade.

In an attempt to eliminate the auxiliary blade, a diverter blade having a specific shape has been proposed, and such is described in U.S. Pat. No. 5,044,402 which issued on Sept. 3, 1991 and illustrated by FIGS. 3A to 3C. It discloses an angled shaped blade with an intermediate blade portion. When the angled blade 10" is pivoted to by-pass air to the by-pass opening 12" it can be seen that the blade presents to the incoming air flow 14"

substantially similar surface areas 19 and 19' on opposite sides of the pivot shaft 20. In the straight-through position, as shown in FIG. 3A, the portion 21 of the blade closes the by-pass outlet 12". Since the incoming air pressure, indicated by arrows 14", act perpendicular to the blade 10", the forces are not balanced, as the surface portions of the blade are not equal on both sides of the pivot shaft when the blade is displaced. This causes additional torque for the drive motor.

Referring now to FIGS. 4A to 4C, and FIGS. 5 and 6, there will be described the variable air volume terminal unit 25 of the present invention. As herein shown, the unit is constituted by a substantially rectangular housing having a front wall 26, a rear wall 27, a bottom wall 28, a top wall 29, and opposed side walls 30. An inlet 31 is provided in the front wall 26 connected to a main conduit (not shown) of an air handling system via a pipe or a duct coupling 32 to admit conditioned air under pressure into the housing 25. The housing 25 is also provided with a main outlet 33 provided to one side of the rear wall 27 and a by-pass outlet 34, herein shown as provided in the side wall 30. The by-pass outlet 34 could also be provided in the top wall 29 or bottom wall 28, and it usually redirects air into an air return conduit (not shown) of the air handling system or in a ceiling plenum. A means of varying the by-pass opening to permit the balancing of the air flows in the respective outlet is shown as a sliding plate 51. A divider wall 35 separates the main outlet 33 from the by-pass outlet 34.

An air divider gate 36 is slidingly displaceable between a pair of guide tracks or channels 37 secured transversely in the housing 25 and disposed transverse to the air flow path entering the inlet opening 31. As herein shown, the divider gate 36 is secured to a linkage mechanism or link arm 37' which is actuated by an axially rotatable drive shaft 38 operated by an actuator device 39 which may be an electrically operated drive motor or a pneumatic drive unit.

Figure 5:
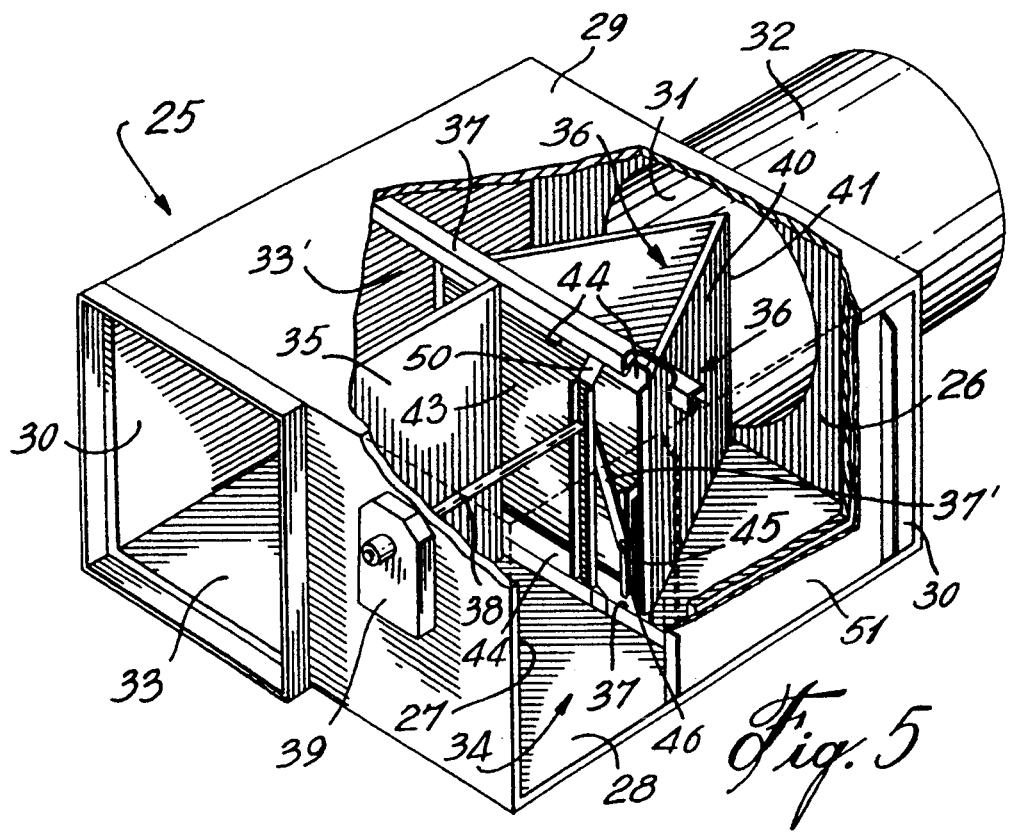
FIG. 5 is a fragmented perspective view showing a preferred form of construction of a variable air volume terminal unit in accordance with the present invention.
Figure 6:
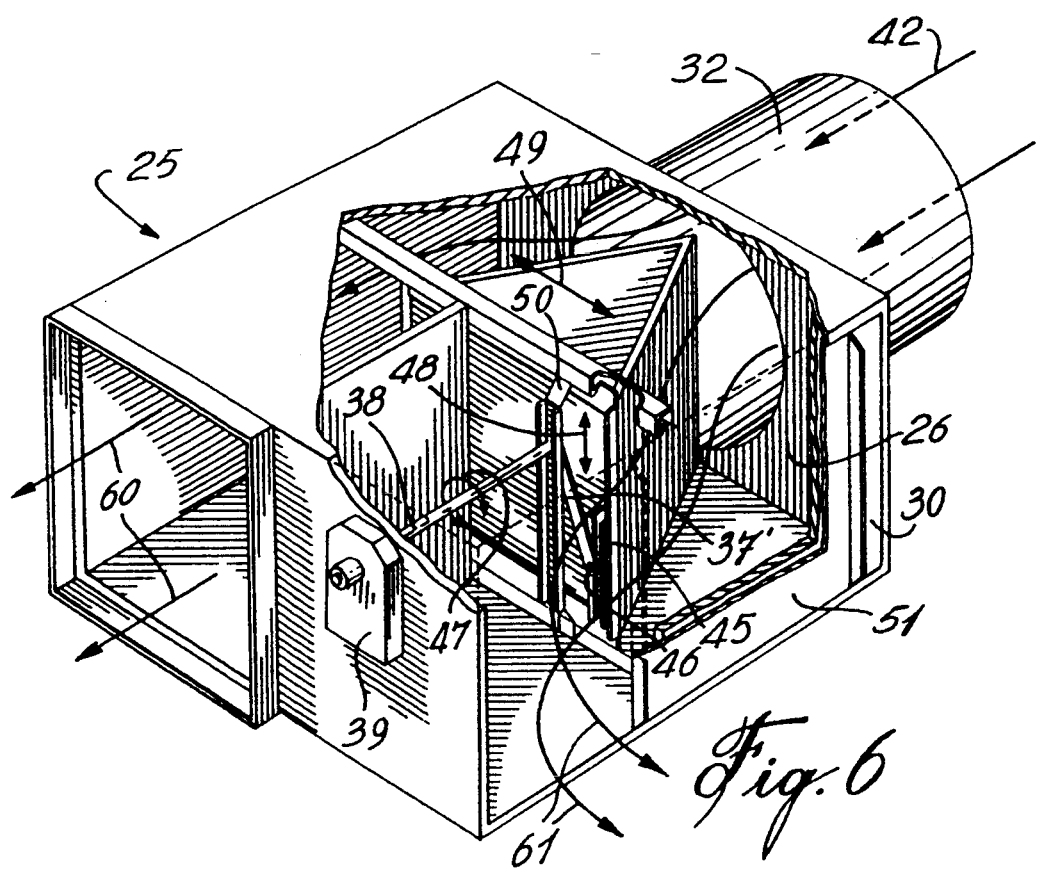
FIG. 6 is a similar perspective view of the air divider gate of the present invention showing the air flow paths.

As illustrated more specifically in FIGS. 5 and 6, the divider gate is of substantially triangular shape cross-section and defines an upstream deflecting face formed as a triangular wedge 40 having opposed angulated deflecting faces. The apex 41 of the triangular wedge 40 faces the incoming air flow path 42, as better illustrated in FIGS. 4A to 4C. The main outlet 33 has an entrance 33' formed between the tracks 37 to one side of the triangular divider gate 36 and the by-pass outlet has an entrance 34' on the opposite side of the divider gate.

As can be seen, the divider gate rear end 43 constitutes an outlet obstructing rear end of the gate. Extension flanges 44 are provided along the top and bottom edge of the rear end and are guidingly received within the guide tracks 37. The flanges 44 constitute bearing means which slide within the tracks 37.

A vertical slide track 45 is secured across the rear end and receives a follower member 46 secured to an end of the link arm 37'. As the actuating rod 38 is axially rotated as shown by the arrow 47, the link arm follower member 46 will move up and down the slide track 45 in the directions of arrows 48 to displace the deflector along its guide tracks 37, transversely to the incoming air flow and in the direction indicated by arrows 49. Because the deflector gate 36 always faces the incoming air flow, which is at substantially constant pressure and guided transversely thereto, a substantially constant resistance is present and consequently the torque force required to displace the divider gate by the actuator device 39 is also substantially constant. The actuating rod 38 is supported stationary between a bracket 50 and the rear wall 27 of the housing. It is pointed out that other suitable linkages and drives may be provided to displace the divider gate 36, and the invention should not be restricted to the linkage mechanism herein shown.

The diverter gate 36 and its rear end 43 are dimensioned to be approximately equal to the size of the outlet entrance openings 33' and 34' so that it can totally block the main outlet entrance 33' or the by-pass outlet 34', or portions of both. As the divider gate is displaced across the air flow path, it simultaneously opens one of the entrances to the openings and closes the other in equal proportions with the total outlet surface area (the combination of both outlets) remaining substantially constant. Also, the force, due to the velocity of the air impinging against the divider gate at the extremes of its travel, will be reduced, since only half of the gate is within the air flow, and as the gate moves to an intermediate position, the deflector equalizes the velocity forces by splitting the air flow, as shown by flow lines 60 and 61 in FIG. 6. The partial obstruction created by the deflector gate, as the gate approaches the midcycle, tends to counter-balance the problem of the lower pressure requirements of the outlet duct associated with their reduced duct velocities, thus maintaining approximately constant inlet air flow conditions, as previously mentioned.

It is within the ambit of the resent invention to cover any obvious modifications of the example of the preferred embodiment described herein, provided such modifications fall within the scope of the appended claims.

I claim:

1. A variable air volume terminal unit for an air handling system, said unit comprising a housing having a conditioned air inlet for receiving forced conditioned air in said housing, said housing having a main outlet opening, a by-pass air outlet opening, an air flow path defined between said air inlet and said outlet openings, an air divider gate slidingly displaceable transverse to said air flow path to deflect air entering said inlet to one or both of said outlet openings, said divider gate having an outlet obstructing rear end and an upstream deflecting face, linkage means connected to said divider gate, an actuator device connected to said linkage means to displace said divider gate across said air flow path to simultaneously open one of said outlet openings and close the other in predetermined proportions as desired while maintaining a substantially constant total outlet opening area as well as maintaining substantially constant inlet air flow conditions while the force required to displace said divider gate by said actuator device remains substantially constant, said upstream deflecting face being a triangular wedge shaped face of said divider gate having an apex ridge facing said inlet, said apex ridge extending vertically of said outlets, said outlet openings being substantially equal in cross-section and positioned side by side and equidistantly spaced from a central flow axis of said inlet, said housing being rectangular housing with said inlet being disposed substantially central to a front wall of said housing, said tracks being secured to a respective one of opposed walls, said divider gate having a rectangular rear end guidingly secured at opposed edges by bearing means slidingly engaged between said tracks, said outlet openings being dimensioned to be totally obstructed by said rear wall when said divider gate is disposed in obstructing alignment therewith.

2. A terminal unit as claimed in claim 1 wherein said linkage means comprises a slide track secured to said rear wall of said divider gate, a link arm having a follower member at one end slidingly engaged in said slide track, an actuating rod secured to another end of said link arm, said actuating rod being axially rotatable by said actuator device to pivot said link arm to displace said divider gate between and along said tracks.

3. A terminal unit as claimed in claim 2 wherein said actuator device is an electrically operated actuator device.

4. A terminal unit as claimed in claim 2 wherein said actuator device is a pneumatically operated actuator device.

5. A terminal unit as claimed in claim 1 wherein said main outlet opening extends to a rear wall of said housing adjacent a side wall thereof, said by-pass opening extending to another side wall or a top wall of said housing.

* * * * *